United States Patent [19]

Donohue

[11] Patent Number: 4,530,031

[45] Date of Patent: Jul. 16, 1985

[54] DIELECTRIC COMPOSITION

[75] Inventor: Paul C. Donohue, Wilmington, Del.

[73] Assignee: E. I. Du Pont de Nemours and Company, Wilmington, Del.

[21] Appl. No.: 588,742

[22] Filed: Mar. 12, 1984

[51] Int. Cl.$^3$ .................. H01G 4/12; C04B 35/46
[52] U.S. Cl. .................................... 361/321; 501/137
[58] Field of Search .................. 361/311, 320, 321; 501/134, 136, 137, 138

[56] References Cited

U.S. PATENT DOCUMENTS

| 3,755,723 | 8/1973 | Short | 361/321 |
| 4,220,547 | 9/1980 | Abe et al. | 361/321 X |
| 4,475,144 | 10/1984 | Lagrange et al. | 361/321 |

FOREIGN PATENT DOCUMENTS

| 142617 | 11/1981 | Japan | 361/321 |

*Primary Examiner*—Donald A. Griffin

[57] ABSTRACT

A high capacitance dielectric powder composition consisting essentially of finely divided particles of (a) 92–99% wt. $BaTiO_3$ and (b) 8–1% wt. of a sintering aid consisting essentially of Pb or Li fluoride and optionally one or more oxides of Bi, Zn and Pb or precursors thereof.

5 Claims, No Drawings

DIELECTRIC COMPOSITION

FIELD OF INVENTION

The invention relates to dielectric compositions and particularly to such dielectric compositions which are suitable for use in thick film applications.

BACKGROUND OF THE INVENTION

The use of screen-printable thick film dielectric compositions to form printed capacitors for use in conjunction with conductive metal terminations is relatively new in the art of constructing electronic systems. In general these materials are comprised of finely divided particles of a ferro-electric material such as $BaTiO_3$ and a sinterable inorganic binder or sintering aid for the ferro-electric material dispersed in an organic medium. Such compositions are typically printed over a metal electrode layer and overprinted by a second metal electrode layer. Each layer can be fired separately, or all of the layers can be co-fired to volatilize the organic medium and to sinter the ferro-electric material, thus forming a simple capacitor. Multilayer capacitors can be made by adding further alternating layers of dielectric and electrode materials. Compositions of this kind have recently been proposed as an economical way of making capacitors for electrical filter connectors for alternating high frequency interference for electrical devices. Such devices are described in pending U.S. Patent Application Ser. No. 480,593, filed Mar. 30, 1983. When thick film compositions are used for making capacitors for electrical filter connectors, it is essential that the dielectric layers be very thin. In fact, the dielectric layer may be comprised of more than one printed and fired layer of thick film material. However, when very thin dielectric layers are employed, it is essential that the dielectric material be quite homogeneous and that upon sintering it not be diluted with glass binder components or with sintering aid compounds, thereby reducing the capacitance of the layer. Therefore, there exists a strong need for screen-printable thick film dielectric compositions which can be printed as very thin layers atop electrodes with only small amounts of sintering aids therein.

BRIEF DESCRIPTION OF THE INVENTION

In its primary aspect, the invention is directed to a high capacitance dielectric composition consisting essentially of finely divided particles of (a) 92–99% wt. $BaTiO_3$ or precursor thereof, substantially all of the $BaTiO_3$ particles having a particle size no greater than 1 $\mu$m in largest dimension, and (b) 8–1% wt. of a sintering aid consisting essentially of (1) 8–0.5% wt. fluoride of Pb, Li or mixtures thereof and (2) 4–0% wt. of an oxide of Bi, Zn or Pb, precursors of such oxides or mixtures thereof, the weight ratio of fluoride to oxide in (b) being at least 1.

In a second aspect, the invention is directed to screen-printable thick film compositions comprising the above-mentioned dielectric powder dispersed in an organic medium.

In a third aspect, the invention is directed to a capacitor comprising (1) a first conductor terminal layer supported on an insulative ceramic substrate on which is printed (2) a layer of the above-described screen-printable dielectric composition and (3) a second overlying conductive terminal layer, the layers having been fired either separately or together to volatilize the organic medium and to effect sintering of the dielectric powders. To obtain better hermeticity, the capacitor can be overglazed with one or more layers of glass.

DETAILED DESCRIPTION OF THE INVENTION

A. Inorganic Components

The $BaTiO_3$ components can be incorporated into the composition as either already-formed $BaTiO_3$ or as $BaO$ and $TiO_2$ in appropriate molar proportions to form $BaTiO_3$ when the composition is fired at 800°–1000° C. to sinter the dielectric materials and form a densified dielectric body. It is preferred to use already-formed $BaTiO_3$.

The oxide components of the sintering aid likewise can be used in the form of the oxides or of precursors thereof. By the term "precursor" is meant compounds which, upon firing in air to sinter the dielectric material, are converted to metal oxides. These include carbonates, hydroxides, nitrates, oxylates and alkoxides.

The fluoride compounds, on the other hand, are added to the composition as such.

It has been essential to the effectiveness of the invention in filter connector applications that substantially all of the $BaTiO_3$ particles in the composition be no larger than 1 $\mu$m in largest dimension and that none be larger than about 2 $\mu$m. In particular, it has been found that the small particle size in combination with these particular sintering aid materials enables the composition to provide quite high capacitance (K) levels with very small amounts of sintering aid materials.

Even though it is not essential that the sintering aid materials have such small particle size, it is nevertheless essential that they be of a size appropriate to screen printing. It is preferred that substantially all the particles of sintering aid materials be no longer than 2 $\mu$m with particles no larger than 1 $\mu$m being still further preferred.

The above-described compositions in which the inorganic component consists only of the $BaTiO_3$ and the sintering aid materials are, of course, quite effective both electrically and mechanically. Nevertheless, it is possible to use a small amount of inorganic binder with the composition so long as it does not exceed about 10% wt. of the total solids and preferably no more than about 5% wt. of the total solids. Provided that the inorganic binder is chemically inert with respect to the rest of the composition, any glass which has a softening point below the sintering temperature of the dielectric material is suitable. Lead bismuth borosilicates have been found to be particularly suitable.

The desired sintering temperature is determined by the physical and chemical characteristics of the dielectric material. Ordinarily the sintering temperature will be chosen to obtain maximum densification of the dielectric material. For the dielectric compositions of this invention, the temperature will range from 800° to 1050° C. However, it will be recognized by those skilled in the art of fabricating capacitors that maximum densification is not always needed. Therefore, the term "sintering temperature" refers to the temperature (and implicitly the amount of time as well) to obtain the desired degree of densification of the dielectric material for the particular capacitor application. Sintering times also vary with the dielectric composition. The composition of the invention can be fired in conventional thick film belt furnaces. Typically, the firing cycle is about one hour with 10-15 minutes at the peak firing temperature.

B. Organic Medium

The main purpose of the organic medium is to serve as a vehicle for dispersion of the finely divided solids of the composition in such form that it can readily be applied to a ceramic or other substrate. Thus, the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling, and good firing properties. Satisfactory appearance of the fired composition is also important.

In view of all these criteria, a wide variety of inert liquids can be used as organic medium. The organic medium for most thick film compositions is typically a solution of resin in a solvent and frequently a solvent solution containing both resin and thixotropic agent. The solvent usually boils within the range of 130°-350° C.

The most widely used solvents for thick film applications are terpenes such as $\alpha$- or $\beta$-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the desired viscosity and volatility requirements for each application.

Among the thixotropic agents which are commonly used are hydrogenated caster oil and derivatives thereof and ethyl cellulose. It is, of course, not always necessary to incorporate a thixotropic agent since the solvent/resin properties coupled with the shear thinning inherent in any suspension may alone be suitable in this regard.

The ratio of organic medium to inorganic solids in the paste dispersions can vary considerably and depends upon the manner in which the dispersion is to be applied and the kind of organic medium used. Normally, to achieve good coverage the dispersions will contain complementally by weight 60-90% solids and 40-10% organic medium.

The pastes are conveniently prepared on a three-roll mill. The viscosity of the pastes is typically within the following ranges when measured at room temperature on Brookfield viscometers at low, moderate and high shear rates:

| Shear Rate (Sec$^{-1}$) | Viscosity (Pa · s) | |
| --- | --- | --- |
| 0.2 | 100-5000 | — |
|  | 300-2000 | Preferred |
|  | 600-1500 | Most preferred |
| 4 | 40-400 | — |
|  | 100-250 | Preferred |
|  | 140-200 | Most preferred |
| 384 | 7-40 | — |

| Shear Rate (Sec$^{-1}$) | Viscosity (Pa · s) | |
| --- | --- | --- |
|  | 10-25 | Preferred |
|  | 12-18 | Most preferred |

The amount and type of organic medium (vehicle) utilized is determined mainly by the final desired formulation viscosity and print thickness.

The following properties which are relevant to the ability of a given capacitor to function properly are referred to in the examples.

Capacitance

Capacitance is a measure of the capability of a material to store an electrical charge. Expressed mathematically, C=KAN divided by t, where K is dielectric constant. A equals area overlap of electrodes, N is the number of dielectric layers, and t is thickness of dielectric layer.

The units of capacitance are farads or fractions thereof such as microfarads ($10^{-6}$ farad), nanofarads ($10^{-9}$ farad) or picrofarads ($10^{-12}$ farad).

Dissipation Factor

Dissipation Factor (DF) is a measure of the phase difference between voltage and current. In a perfect capacitor, the phase difference would be 90°. However, in practical dielectric systems, DF is less than 90° because of leakage and relaxation losses. In particular, DF is the tangent of the angle by which the current lags the 90° vector.

EXAMPLES

Example 1

A dielectric powder composition was prepared by roll milling a finely divided BaTiO$_3$ ($\leq$0.9 $\mu$m) powder with a uniform admixture of the powdered sintering aid materials which had been prepared by ball milling. The following weight proportions were used in the dielectric material:

BaTiO$_3$: 95.6% wt.
ZnO: 0.6
Bi$_2$O$_3$: 0.7
PbF$_2$: 1.7
PbO: 0.8
LiF: 0.6
Fluoride/oxide ratio: 1.1

The above-described dielectric powder (81% wt.) was then dispersed by roll milling in a conventional thick film organic medium (19% wt.) to form a screen-printable paste. Two thick film coats were printed through a 250-mesh screen onto a patterned Pd/Ag thick film electrode which had been coated on an Al$_2$O$_3$ substrate. The electrode had been prepared by printing, drying and firing a conventional thick film paste comprising particles of the Pd/Ag metal and inorganic binder dispersed in organic medium. The first capacitor coat was dried and fired before applying the second coat, which was then also dried and fired. Both of the layers of each of the capacitors prepared were fired at the same temperature which was either 850° C. or 950° C. to volatilize the organic medium and sinter (densify) the dielectric material. After firing the second coat of the dielectric layer, a second patterned layer of Pd/Ag electrode material was printed atop the fired dielectric layer, dried and fired to volatilize the organic medium and sinter the inorganic binder. Several capacitors made in this manner were tested as is and several were coated with two layers of noninteractive glass to render the capacitor assemblage more hermetic. The electrical properties of the resultant capacitors were as follows:

| Firing Temperature Electrical Properties | | 850° C. | 950° C. |
|---|---|---|---|
| Without Overglaze | K | 1891 | 1879 |
| | DF (%) | 3.4 | 2.5 |
| With Overglaze | K | 2110 | 2004 |
| | DF (%) | 2.4 | 2.7 |

Capacitors having quite high K values were produced at both low and high firing temperatures and both with and without the overglaze layers. Dissipation factors for all the capacitors were satisfactorily low.

Examples 2-4

A series of three dielectric powders was prepared by mixing finely divided ($\leq 0.9$ μm) powder in the proportions indicated in Table 1 below. The mixed powders were then dispersed into a conventional thick film organic medium (19% wt.) to form a screen-printable paste. Several capacitors were prepared from this paste in the manner of Example 1 and were tested to observe their electrical properties. The composition of the dielectric materials and the electrical properties of the capacitors made therefrom are given in Table 1 below.

TABLE 1

Dielectric Layer Compositional Variations

| | Example No. | | |
|---|---|---|---|
| | 2 | 3 | 4 |
| | (% wt.) | | |
| Composition of Dielectric Material | | | |
| $BaTiO_3$ | 97.0 | 95.6 | 92.4 |
| ZnO | 0.4 | 0.7 | 1.0 |
| $Bi_2O_3$ | 0.5 | 0.8 | 1.3 |
| $PbF_2$ | 1.1 | 2.0 | 3.2 |
| PbO | 0.5 | 0.9 | 1.5 |
| LiF | 0.4 | — | 0.6 |
| Fluoride/Oxide Ratio | 1.1 | 0.8 | 1.0 |
| Capacitor Properties | | | |
| 850° C. Firing Temperature | | | |
| K | 1536 | 1513 | — |
| DF (%) | 3.0 | 1.8 | — |
| 950° C. Firing Temperature | | | |
| K | 1507 | 1740 | 2360 |
| DF (%) | 2.4 | 2.2 | 3.2 |

The capacitors of Examples 2 and 3 had quite high K values when fired at either 850° C. or 950° C. The capacitance of the capacitors of Example 4 fired at 850° C. were not measured, but those fired at 950° C. showed quite high K values. All of the capacitors which were tested also had quite satisfactorily low DF values.

Examples 5-6

A further test was carried out in which several capacitors were fabricated in the same manner as the previous Examples using two separate thick film dielectric pastes. The dielectric layers were, however, fired at 950° C. only. In one of the pastes, the particle size of the $BaTiO_3$ component was greater than 1 μm and in the other it was less than 1 μm. The composition of the dielectric materials and the electrical properties of the capacitors made therefrom are given in Table 2 below.

TABLE 2

Effect of Particle Size of $BaTiO_3$ on Capacitance

| | Example No. | |
|---|---|---|
| | 5 | 6 |
| | (% wt.) | |
| Composition of Dielectric Material | | |
| $BaTiO_3$ | 93.6 | 93.0 |
| ZnO | 1.0 | 1.0 |
| $Bi_2O_3$ | 1.3 | 1.3 |
| $PbF_2$ | 3.1 | 3.1 |
| PbO | 1.5 | 1.5 |
| Fluoride/Oxide Ratio | 0.8 | 0.8 |
| Particle Size of $BaTiO_3$ | 0.9 μm max. | 1.7 μm max. |
| Capacitor Properties | | |
| K | 1750 | 732 |
| DF (%) | 2.1 | 2.7 |

The data in Table 2 show that much higher capacitance was obtained from the dielectric material in which the more finely divided $BaTiO_3$ powder was used.

I claim:

1. A high capacitance dielectric powder composition consisting essentially of finely divided particles of (a) 92-99% wt. $BaTiO_3$ or precursors thereof, and (b) 8-1% wt. of a sintering aid consisting essentially of (1) 8-0.5% wt. fluoride of Pb, Li or mixtures thereof and (2) 4-0% wt. of an oxide of Bi, Zn or Pb, precursors of such oxides or mixtures thereof, the weight ratio of fluoride to oxide in (b) being at least 1, substantially all of the particles having a particle size no greater than 1 μm in largest dimension.

2. A screen-printable high capacitance dielectric composition comprising the composition of claim 1 dispersed in organic medium.

3. A high capacitance capacitor comprising (1) a first conductive terminal layer supported on an insulative ceramic substrate on which is printed (2) a layer of the dielectric composition of claim 2 and (3) a second overlying conductive terminal layer, the assemblage having been fired to volatilize the organic medium and to effect sintering of the dielectric powder.

4. The capacitor of claim 3 in which the conductive terminal layers and the dielectric layers are applied by screen-printing and each of the printed layers is dried and fired before application of a succeeding layer.

5. A filter connector for reducing electro-magnetic inteference in electrical devices, the filter element of which is comprised of a multiplicity of closely spaced thick film capacitors having at least one dielectric layer therein, the dielectric material of which is the composition of claim 2 which has been fired to effect volatilization of the organic medium and sintering of the dielectric powder.

* * * * *